Nov. 17, 1959 A. MACOVSKI ET AL 2,913,519
CHROMINANCE SIGNAL AMPLIFIER CONTROL CIRCUIT
Filed Sept. 16, 1958
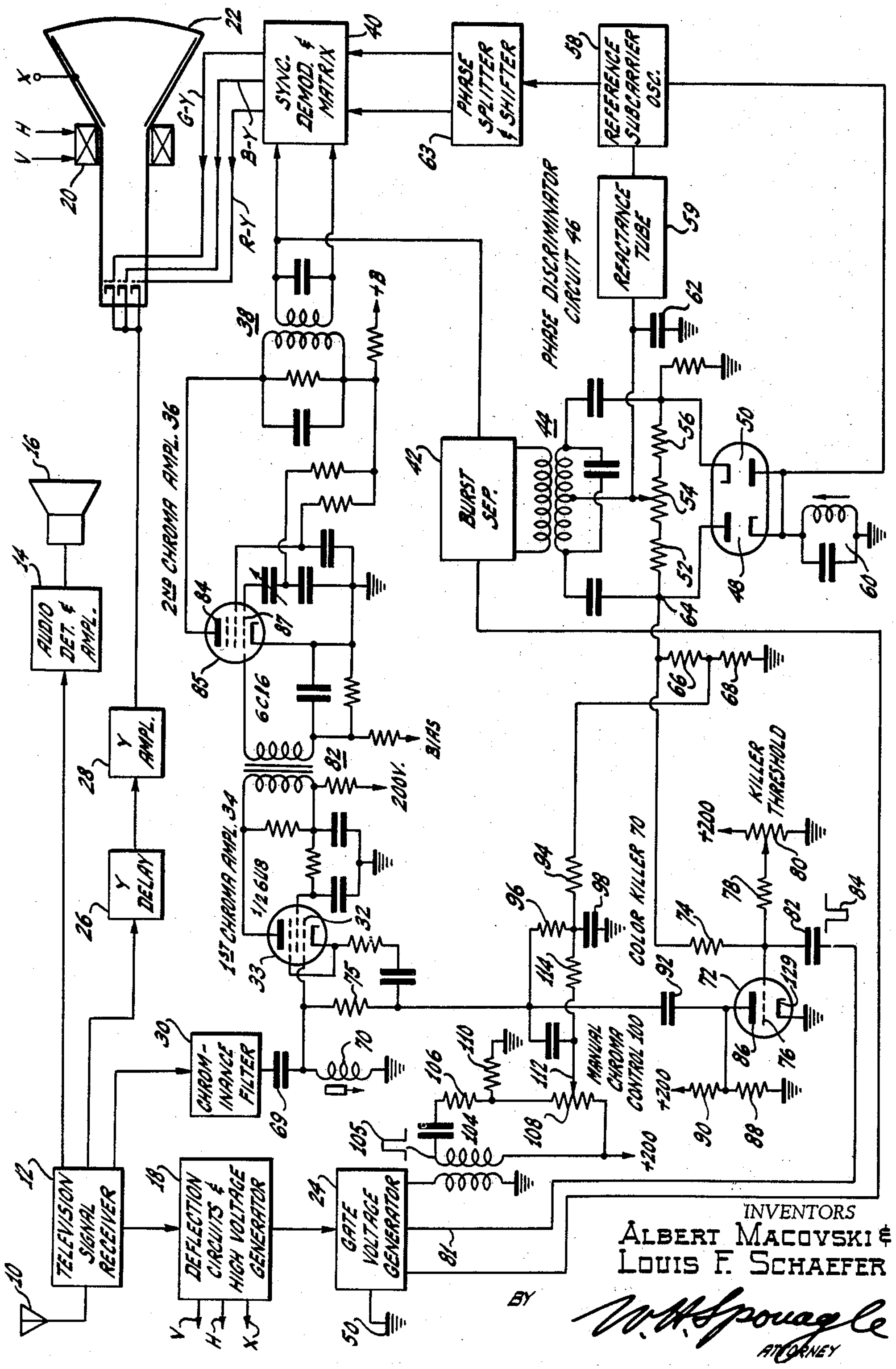
INVENTORS
ALBERT MACOVSKI &
LOUIS F. SCHAEFER
BY W. H. Sprague
ATTORNEY United States Patent Office 2,913,519

Patented Nov. 17, 1959

2,913,519

CHROMINANCE SIGNAL AMPLIFIER CONTROL CIRCUIT

Albert Macovski, Massapequa, N.Y., and Louis F. Schaefer, Maywood, N.J., assignors to Radio Corporation of America, a corporation of Delaware Application September 16, 1958, Serial No. 761,341

7 Claims. (Cl. 178—5.4)

This invention relates to color television receiving systems and more particularly to manually adjustable circuits for controlling the color saturation of pictures reproduced by color television receivers.

Commercially available color television receivers are generally provided with a manual control for adjusting the color saturation of a reproduced picture to the personal tastes of the viewer. The variation of color saturation is effected in most commercially available receivers by varying the gain of the chrominance signal amplifier channel.

In color television receivers heretofore proposed, the chrominance signal and color synchronizing burst components of a received color television signal are amplified in a bandpass or chrominance signal amplifier channel. Suitable circuits are coupled to the chrominance amplifier channel output circuit for separating the color synchronizing burst from the chrominance signal components. The primary purpose of the separated burst component is to provide a reference signal for synchronizing the color reference oscillator circuit of the receiver. However, the bursts may also be rectified to derive an automatic chroma control voltage for controlling the gain of the chrominance amplifier channel.

In this type of receiver, manual chroma control may be provided by adjusting the amplitude of pulses applied to the chrominance amplifier during the burst interval. As the pulse amplitude is varied, the gain control loop of the chrominance amplifier tends to maintain the burst component at constant amplitude by effecting a change in the automatic chroma control voltage which is developed by rectification of the burst component. The resulting automatic chroma control voltage changes the gain of the amplifier channel for the chrominance signal components which occur during the ensuing line interval. It has been found that such changes in the manual chroma control pulse amplitude often causes the burst amplitude at the output of the chrominance amplifier to vary between a small value which results in poor lock-in characteristics of the color reference oscillator, and a large value which is beyond the signal handling capabilities of the system, causing lock-out.

It is, accordingly, an object of this invention to provide an improved manually adjustable circuit for controlling the color saturation of color pictures reproduced by color television receivers.

Another object of this invention is to provide an improved manual chroma control circuit for color television receivers in which the amplitude of the color synchronizing burst is not appreciably affected by variations in the setting of the manual chroma control.

A further object of this invention is to provide an improved manual chroma control circuit of the type described wherein there is substantially no dependence of the color synchronizing burst amplitude on the amplitude of the manual chroma control pulses.

In accordance with the present invention a direct voltage is introduced with a manual chroma control pulse in a manner that the rectified burst does not have to supply the gain controlling voltage changes as the pulse amplitude is changed. The direct voltage is varied in a manner complementary to that of the pulse so that the bias produced by this combination during the interval of the color synchronizing burst is always at substantially the same level. Thus, adjustment of the manual chroma control does not change the operating characteristics of the chrominance amplifier during the burst interval, and therefore has no effect on burst amplitude. The direct voltage which is present during the following line interval, causes the gain of the chrominance amplifier to change in the desired manner for the chrominance signal components.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the sole figure is a schematic circuit diagram, partly in block form, of a color television receiver incorporating a manual chroma control circuit embodying the invention.

In the color television receiver circuit shown in the drawings, television signals intercepted by an antenna 10 are applied to television signal receiver circuits 12 which are common to both monochrome and color television receivers. For example, it is intended that the tuner, intermediate frequency (I.F.) amplifier, second detector, and automatic gain control circuits be included in the receiver circuits 12. These and other circuits are shown in detail in the Service Data for the RCA Victor Color Television Receivers, Models 21–CT–660U to 21–CT–664U, second edition, first printing, dated December 9, 1955.

During color television reception, the demodulated signals appearing at the output terminal of the television signal receiver circuits 12 comprises horizontal and vertical synchronizing signals, luminance or brightness signal components, chrominance signal components, and color synchronizing bursts. During monochrome signal reception, the chrominance signal components and color synchronizing bursts are absent. In addition, for both monochrome and color reception, a frequency modulated 4.5 mc. intercarrier sound signal appears at the output terminal of the circuits 12.

The 4.5 mc. intercarrier sound signal which results from the heterodyning of the sound and picture I.F. carriers in the intermediate frequency amplifier portion of the receiver circuits 12 is recovered by suitable tuned circuits and is demodulated and amplified in an audio detector and amplifier circuit 14 and is applied to a loudspeaker 16.

The video portions of the recovered television signal are applied to the deflection circuits and high voltage generator 18. These circuits include the usual synchronizing signal separator, and use the separated horizontal and vertical synchronizing pulses to control horizontal and vertical oscillators respectively. The output signals from the horizontal and vertical oscillators which may be amplified, are available at the terminals designated H and V respectively and are applied, through circuit connections not shown, to corresponding terminals on a deflection yoke 20 of a color image reproducing device 22. In addition, a high unidirectional voltage which is developed by the high voltage generator is applied from the terminal X to a corresponding terminal X which is connected to the ultor of the image reproducing device 22. The deflection circuits and high voltage generator 18 also furnish excitation for a gate voltage generator 24 which, in the circuit to be described, provides gate voltage pulses which have about the same duration interval as the color synchronizing bursts and are in time coincidence therewith.

The demodulated television signals from the receiver circuits 12 are passed through a time delay device indicated as Y-delay 26 and a luminance or brightness amplifier indicated as Y-amplifier 28. The luminance signal is amplified to a suitable level in the amplifier 28 and is applied to the cathodes of the color image reproducing device 22.

The demodulated television signals from the receiver circuits 12 are also applied to a chrominance signal amplifier channel which includes a bandpass filter indicated as the chrominance filter 30 which has a frequency passband corresponding to the desired portion of the chrominance signal frequency range to be amplified in the chrominance amplifier channel. The output signals from the chrominance bandpass filter 30 are applied to a control grid 32 of an amplifier tube 33 included in the first chrominance amplifier 34. The first chrominance amplifier 34 is coupled to a second chrominance amplifier 36 which provides additional amplification of the chrominance signal component. The resulting chrominance signal component is developed across the output circuit 38 which has a bandpass characteristic suitable for the transmission and amplification of the entire chrominance signal.

The chrominance signals developed in the output circuit 38 are applied to a synchronous demodulator and matrix circuit 40 together with signals from a reference subcarrier oscillator 58 to derive color difference signal information from the chrominance components of the color television signal. These color difference signals are impressed on suitable control electrodes of the color image reproducing device 22 so that signal addition of the color difference signals and the luminance signal is achieved within the color image reproducing device. In other forms of color receivers, auxiliary adder circuits may be used for the addition of the luminance and color difference signals with the resulting component color signals then applied to suitable control electrodes of the color image reproducer.

The amplified chrominance signals appearing across the output circuit 38 are also applied to a burst separator circuit 42 which is keyed by a gating pulse from the gate voltage generator 24. As mentioned above, the gating pulses produced by the gate pulse generator 24 occur at the same time as the color synchronizing burst and are operative to key the burst separator 42 to pass only the color synchronizing bursts into the output circuit of the burst separator which comprises the primary winding of the transformer 44.

The secondary winding of the transformer 44 is connected in circuit with a phase discriminator circuit 46. The phase discriminator circuit 46 comprises essentially a pair of diodes 48 and 50 which are connected in such a way that the cathode of the diode 50 and the anode of the diode 48 are coupled to the burst separator transformer secondary winding 44. Three resistors 52, 54 and 56 are connected in series between the anode of the diode 48 and the cathode of the diode 50. A center tap on the secondary winding of the transformer winding 44 is connected to a movable tap on the resistor 54 which is adjustable to balance the discriminator circuit. The reference subcarrier oscillator 58 provides signals of a common phase to the cathode of the diode 48 and the anode of the diode 50. These signals are developed across a resonant circuit 60 which includes an adjustable inductor for providing a hue control for the receiver by enabling a slight adjustment of the phase of the oscillator signals applied to the discriminator circuit.

The action of the phase discriminator 46 is to compare the phase of the signal provided by the burst separator 42 with the phase of the signal generated by the reference subcarrier oscillator 58. A phase difference indicating voltage is produced at the adjustable tap on the resistor 54 and is integrated across the capacitor 62 to produce a substantially continuous direct voltage which yields indication of the phase and frequency difference existing between the color synchronizing burst and the signal generated by the reference subcarrier oscillator 58. The phase error signal is then applied to a reactance tube 59 which is operative to control the frequency of the reference subcarrier oscillator 58. If the phase of the signal provided by the subcarrier oscillator 58 differs from that prescribed by the color synchronizing burst, the phase error indicating signal applied to the reactance tube 59 produces a change in the reference subcarrier oscillator phase in a direction to minimize the phase error.

The phase discriminator 46 also serves the additional function of providing a control voltage which is indicative of both the amplitude and of the presence or absence of the color synchronizing burst. This voltage represents amplitude detection of the color synchronizing burst and is developed across the resistors 66 and 68, for use as a bias voltage for a color killer circuit 70 and as an automatic chroma control voltage for controlling the gain of the first chrominance amplifier 34.

The color killer circuit 70 includes a tube 72 which is adapted to conduct during monochrome television signal reception to disable the chrominance amplifier channel, and to be cut-off during color reception at which time the chrominance amplifier channel is effective to amplify signals applied thereto. To this end, the voltage appearing across the series combination of the resistors 66 and 68 is applied through a resistor 74 to the control grid 76 of the color killer tube 72. The control grid 76 is also connected through a resistor 78 to the adjustable tap of a potentiometer 80 which sets the threshold at which the color killer tube begins to conduct. The control grid 76 is also connected by way of a capacitor 82 to the gate voltage generator 24 to receive a negative going gating pulse 84 which is in time coincidence with the color synchronizing burst. A polarizing potential is applied to the anode 86 of the color killer tube 72 through a voltage divider including a pair of resistors 88 and 90 which are connected in series between ground and an operating potential supply terminal indicated as being 200 volts. The anode is also coupled through a capacitor 92 to the input circuit of the first chrominance amplifier stage 34.

As indicated above, the voltage appearing between the terminal 64 and ground is also indicative of the amplitude of the color synchronizing burst, and as such is useful as an automatic chroma control voltage to control the gain of the chrominance amplifier channel in accordance with the variations of burst amplitude. The voltage developed across the resistor 68 is applied through a resistor-capacitor network including the resistors 94 and 96 and the capacitor 98 to the input circuit of the first chrominance amplifier stage 34.

Manual control of the gain of the chrominance signal channel in accordance with the invention is provided by a manual chroma control circuit 100. In the manual chroma control circuit a pulse derived from the pulse gate generator 24 is coupled through the transformer 102 to a secondary winding 104. The positive going pulses 105 developed across the secondary winding 104 appear across a pair of resistors 106 and 108 which are connected in series across the winding 104. A third resistor 110 is connected in series with the resistor 108 between ground and a positive operating potential supply terminal which is indicated as being 200 volts. A portion of the direct and gating pulse voltages appearing at the adjustable tap 112 on the resistor 108, is applied by way of the resistors 114 and 96 to the input circuit of the first chrominance amplifier 34. As will hereinafter be described, the change in direct voltage effected by the adjustment of the adjustable tap 112 on the resistor 108 is complementary to the change in amplitude of the gating pulse 105 appearing across the winding 104 so that the net bias applied to the chrominance amplifier channel during the gating pulse interval is substantially the same for different settings of the tap 112. The direct voltage component at the tap 112 provides the gain control voltage for the chrominance amplifier 34 during the ensuing line interval.

The operation of the color killer circuit 70 is to disable the chrominance amplifier channel during monochrome television signal reception, and to permit effective amplification of the chrominance signal components when a color television signal is being received. The direct voltage appearing at the terminal 64 is indicative of the present or absence of the color synchronizing burst which is only present in color transmissions, and hence is used to control the color killer circuit 70. The circuit is designed so that the direct voltage at the terminal 64 is more negative when the color synchronizing burst is present than when it is absent due to the rectification current through the diode 48 and associated load resistors.

For color television signal reception, the direct voltage appearing at the terminal 64, is sufficiently negative so that the color killer tube 72 is cut-off. In this condition, the color killer circuit has no effect on the chrominance amplifier stage 34.

When monochrome television signals are being received, the less negative direct voltage appearing at the terminal 64 of the phase discriminator 46 is of a value to permit the color killer tube 72 to conduct. Negative pulses 84 from the gate voltage generator 24 are applied to the control grid 76 of the color killer tube to periodically reduce the current through this tube during the interval at which the color synchronizing burst would occur if present. This causes a positive pulse to be developed at the anode 86 of the color killer tube 72 which is conveyed through the capacitor 92 to the control electrode 32 of the first chrominance amplifier 34. This positive pulse conditions the chrominance amplifier to be effective to amplify signals applied to the input circuit thereof during this interval. If a color television signal is being received, the burst component will pass through the chrominance amplifier channel and burst separator to the phase discriminator 46, and the negative voltage produced at the terminal 64 will be effective to render the color killer tube 72 non-conductive. If no color synchronizing burst is present, the positive pulses aplied through the capacitor 92 are of an amplitude to cause conduction between the cathode and control grid of the chrominance amplifier tube 35 to charge the capacitor 92 sufficiently to maintain the chrominance amplifier cut-off during the following line interval.

During color television signal reception, the direct voltage developed across the resistor 68 which is a function of the amplitude of the color synchronizing burst, is applied to the input circuit of the chrominance amplifier 34. This voltage which is referred to as an automatic chroma control voltage adjusts the gain of the chrominance amplifier 34 to compensate for selective attenuation of the chrominance components (high frequency) of a television signal as compared to the low frequency components, in the transmission of the signal. In other words, the automatic chroma control voltage tends to maintain a constant color saturation for a given reproduced color scene.

Since the tastes of viewers differ as to what constitutes a desired level of saturation, a manual chroma control is provided for independently adjusting the gain of the chrominance amplifier channel to a level which provides the desired degree of saturation. In accordance with the invention, the manual chroma control circuit 100 causes a direct voltage and a positive pulse to be added to the automatic chroma control voltage applied to the chrominance amplifier stage 34. As the tap on the resistor 112 is moved, the sum of the direct and pulse voltages during the pulse interval remains substantially the same. Since the pulses 105 extend in a positive direction at the upper terminal of the winding 104 with respect to the lower terminal thereof, the pulse amplitude at the tap 112 will become less positive as the tap is moved downwardly along the resistor 108. Conversely, the direct voltage at the tap 112 due to the voltage divider formed by the resistors 108 and 110, becomes more positive as the tap 112 is moved downwardly along the resistor 108. The magnitude of the pulse and direct voltages, and the values of the resistors 106, 108 and 110 are selected so that changes in the position of the tap 112 result in substantially equal and opposite changes in the direct voltage and the peak voltage of the pulses 105.

The manual chroma control circuit described operates to apply approximately the same bias voltage to the chrominance amplifier during the burst interval for different settings of the tap 112. Accordingly, the chrominance amplifier stage 34 will respond to the color synchronizing bursts in the same manner for all settings of the tap 112. The direct voltage component at the tap 112 which is present during the ensuing line interval, between the pulses 105, controls the gain of chrominance amplifier 34 for the chrominance signal components. In this manner the color saturation of a picture can be manually changed without affecting the color synchronizing burst amplitude.

It will be noted that changes in the burst amplitude due to attenuation in the transmission link will produce corresponding changes in the automatic chroma control voltage developed across the resistor 68 in the usual manner. This voltage is combined with the voltages from manual control circuit to maintain the saturation of a picture at given level, which lever is determined by the setting of the manual chroma control 100.

What is claimed is:

1. A manual chroma control circuit for a variable gain chrominance amplifier circuit of a television receiver which is adapted to be disabled during monochrome television signal reception, and enabled for the effective amplification of chrominance signal and color synchronizing burst components during color television signal reception comprising, burst detection means coupled to the output circuit of said chrominance amplifier for providing a control voltage indicative of the presence or absence of said color synchronizing bursts, means responsive to said control voltage for disabling said chrominance amplifier circuit when said color synchronizing bursts are absent, a source of pulses occurring during the color synchronizing burst intervals of sufficient amplitude to periodically enable said chrominance amplifier during the disabled condition thereof, means to apply pulses from said source to said chrominance amplifier circuit to control the gain thereof to amplify said color synchronizing bursts when present, manually adjustable means for varying the amplitude of the pulses applied to said chrominance amplifier, and direct voltage means connected with said manually adjustable means for introducing a direct voltage component with said pulses in a manner that adjustment of said manually adjustable means produces substantially equal and opposite changes in the amplitude of said pulses and direct current component whereby the gain of said chrominance amplifier for chrominance signal components may be altered without substantially affecting the gain thereof during the intervals of said color synchronizing burst components.

2. In a color television receiver for color television signals including chrominance signal components and periodically recurrent color synchronizing burst components, a chrominance signal control system comprising, an amplifier for said chrominance signal and burst components, said amplifier including an input circuit and an output circuit and a gain control terminal connected with said input circuit to which amplifier gain controlling voltages are applied, a burst separator coupled to the output circuit of said amplifier, a burst amplitude detector coupled to said burst separator to provide a control voltage the amplitude of which is a function of the amplitude of said color synchronizing burst components, means to apply said control voltage from said burst amplitude detector to said gain control terminal to provide continuous control of the gain of said amplifier as an inverse function of the amplitude of said color synchronizing bursts, means constituting a source of pulses occurring coincidentally with said bursts, a variable resistor connected with said source of pulses, means constituting a source of direct voltage connected with said variable resistor, and direct current conductive circuit means connecting said variable resistor to said gain control terminal.

3. In a color television receiver for color television signals including chrominance signal components and periodically recurrent color synchronizing burst components, a chrominance signal control system comprising, an amplifier for said chrominance signal and burst components, said amplifier including an input circuit and an output circuit and a gain control terminal connected with said input circuit to which amplifier gain controlling voltages are applied, a burst separator coupled to the output circuit of said amplifier, a burst amplitude detector coupled to said burst separator to provide a control voltage the amplitude of which is a function of the amplitude of said color synchronizing burst components, means to apply said control voltage from said burst amplitude detector to said gain control terminal to provide continuous control of the gain of said amplifier as an inverse function of the amplitude of said color synchronizing bursts, means constituting a source of pulses occurring coincidentally with said bursts, a resistor including a movable tap, means connecting said resistor to said source of pulses so that said pulses are developed across said resistor in a predetermined polarity relation, means constituting a source of direct voltage connected across said resistor in a polarity relative to said pulses that as said tap is moved toward the more positive direct voltage end of said resistor the pulses become correspondingly less positive, and means connecting said tap to said gain control terminal.

4. In a color television receiver for color television signals including chrominance signal components and recurrent color synchronizing burst components, a chrominance signal control system comprising, means constituting an amplifier for said components, said amplifier including a gain control terminal for receiving amplifier gain controlling voltages, a source of pulses occurring coincidentally with said burst components, a source of direct voltage, manually adjustable means for simultaneously varying the amplitude of said pulses and the amplitude of said bursts in opposite directions, and means for applying said amplitude controlled pulses and direct voltage to said gain control terminal to change the gain of said amplifier with adjustments of said manually adjustable means.

5. In a color television receiver for color television signals including chrominance signal components and recurrent color synchronizing burst components, a chrominance signal control system comprising, means constituting an amplifier for said components, said amplifier including a gain control terminal for receiving amplifier gain controlling voltages, a source of pulses occurring coincidentally with said burst components, a source of direct voltage, manually adjustable means for simultaneously varying the amplitude of said pulses and the amplitude of said direct voltage in a complementary manner to maintain the combined amplitude of said pulses and said direct voltage substantially the same during said pulse interval for different settings of said manually adjustable means, and means for applying said amplitude controlled pulses and direct voltage to said gain control terminal to change the gain of said amplifier with adjustments of said manually adjustable means.

6. In a color television receiver adapted to receive a color television signal including chrominance signal components occurring during line trace time and color synchronizing burst components occurring during line retrace time, a chrominance signal control system comprising, an amplifier having an input circuit and an output circuit for said chrominance signal and burst components, circuit means coupled to the output circuit of said amplifier for providing a control voltage the amplitude of which varies as a function of said burst component amplitude, means coupling said circuit means to the input circuit of said amplifier to apply said control voltage to said amplifier to control the gain thereof, a source of pulses occurring at the time of said bursts, a source of direct voltage, manually adjustable means for simultaneously varying the amplitude of said pulses and the amplitude of said direct voltage in opposite directions, and means for applying said pulses and direct voltages to said amplifier to change the gain thereof for chrominance signal components with adjustments of said manually adjustable means.

7. In a color television receiver adapted to receive a color television signal including chrominance signal components occurring during line trace time and color synchronizing burst components occurring during line retrace time, a chrominance signal control system comprising, an amplifier having an input circuit and an output circuit for said chrominance and burst components, circuit means coupled to the output circuit of said amplifier for providing a control voltage the amplitude of which varies as a function of said burst component amplitude, means coupling said circuit means to the input circuit of said amplifier to apply said control voltage to said amplifier to control the gain thereof, a source of pulses occurring at the time of said bursts, a source of direct voltage, manually adjustable means for simultaneously varying the amplitude of said pulses and the amplitude of said direct voltage in a complementary manner to maintain the combined amplitude of said pulses and said direct voltage substantially the same during said burst intervals for different settings of said manually adjustable means, and means for applying said pulses and direct voltage to said amplifier to change the gain thereof for chrominance signal components with adjustments of said manually adjustable means.

No references cited.